United States Patent
Isogami et al.

(10) Patent No.: US 8,597,520 B2
(45) Date of Patent: Dec. 3, 2013

(54) WASTEWATER TREATMENT METHOD AND WASTEWATER TREATMENT APPARATUS

(75) Inventors: Hisashi Isogami, Tokyo (JP); Akira Mochizuki, Tokyo (JP); Hiroshi Sasaki, Tokyo (JP); Tadashi Sano, Ushiku (JP); Satoshi Miyabayashi, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 376 days.

(21) Appl. No.: 13/004,075

(22) Filed: Jan. 11, 2011

(65) Prior Publication Data

US 2011/0168639 A1    Jul. 14, 2011

(30) Foreign Application Priority Data

Jan. 12, 2010   (JP) .................. 2010-004098

(51) Int. Cl.
 *C02F 9/00* (2006.01)
 *C02F 1/48* (2006.01)
 *C02F 1/52* (2006.01)

(52) U.S. Cl.
 USPC ....... 210/695; 210/96.1; 210/175; 210/195.1; 210/199; 210/219; 210/222; 210/223; 210/259

(58) Field of Classification Search
 USPC ............. 210/695, 175, 222, 96.1, 195.1, 199, 210/219, 223, 259
 See application file for complete search history.

(56) References Cited

U.S. PATENT DOCUMENTS 4,039,447 A    8/1977   Miura et al.

FOREIGN PATENT DOCUMENTS

| CN | 2651237 Y | 10/2004 |
|---|---|---|
| EP | 0931593 | 7/2003 |
| EP | 1 676 818 | 7/2006 |
| JP | 59-006918 A | 1/1984 |
| JP | 11-123399 | 5/1999 |
| JP | 11-207399 | 8/1999 |
| JP | 11-319844 A | 11/1999 |
| JP | 2000-051866 A | 2/2000 |
| JP | 2000-202460 A | 7/2000 |
| JP | 2001-170404 A | 6/2001 |
| JP | 2005-111424 A | 4/2005 |
| JP | 2009-082826 A | 4/2009 |
| JP | 2009-220022 A | 10/2009 |
| WO | WO 2009-041410 A1 | 4/2009 |

OTHER PUBLICATIONS

Machine Translation of Japanease Patent No. JP 11-319844, dated Nov. 24, 1999.*

(Continued)

*Primary Examiner* — David A Reifsnyder
(74) *Attorney, Agent, or Firm* — Antonelli, Terry, Stout & Kraus, LLP.

(57) ABSTRACT

A wastewater treatment method in which magnetic flocs are formed by adding to wastewater an inorganic flocculant, magnetic particles, and a high molecular polymer as a polymeric flocculant, and the magnetic flocs are collected with magnetic force to thereby obtain treated water having the magnetic flocs removed from the wastewater, wherein the improvement comprises that
the magnetic particles are added to the wastewater after adding the inorganic flocculant to the wastewater to flocculate suspended solids in the wastewater, after that or substantially at the same time as the magnetic particles are added, the high molecular polymer is added to the wastewater, and flocculates of the suspended solids and the magnetic particles are combined with each other with the high molecular polymer to thereby obtain the magnetic flocs.

22 Claims, 5 Drawing Sheets

(56) References Cited

OTHER PUBLICATIONS

Canadian Search of Appln. No. 2,726,737 dated Aug. 27, 2012 in English.

Letter of Mr. Hu dated Mar. 9, 2012 in English submitted to the Canadian Intellectual Property Office.

JP Office Action Appln. No. 2010-004098 dated May 20, 2013 with partial English language translation.

* cited by examiner

WASTEWATER TREATMENT METHOD AND WASTEWATER TREATMENT APPARATUS

BACKGROUND OF THE INVENTION

1. Field of the Invention

The present invention relates to wastewater treatment methods and wastewater treatment apparatuses and, in particular, to a wastewater treatment method and a wastewater treatment apparatus in which a flocculant and magnetic particles are added to wastewater to treat the wastewater with flocculation magnetic separation.

2. Description of the Related Art

A water treatment method with a flocculation magnetic separation system is the system in which a flocculant and magnetic particles are added to wastewater to be treated, flocculation flocs (hereinafter referred to as magnetic flocs) formed by stirring the wastewater are collected with magnetic force of a magnetic separation apparatus, and thereby treated water is obtained.

With this system, it is necessary to dispose of collected magnetic flocs as industrial waste although the magnetic flocs containing the magnetic particles are collected, and thus supply cost of the magnetic particles and disposal cost of the collected flocs as the industrial waste have caused the increase of running cost.

As a technology for solving this problem, disclosed in Japanese Patent Application Laid-Open No. 11-123399 and Japanese Patent Application Laid-Open No. 11-207399 is the technology in which sludge (magnetic flocs) containing magnetic particles is decomposed with a hydrothermal reaction to thereby reduce the sludge.

Wastewater treatment apparatuses disclosed in Japanese Patent Application Laid-Open No. 11-123399 and Japanese Patent Application Laid-Open No. 11-207399 are the apparatuses in which dirty water is purified with flocculation magnetic separation by using magnetic separation apparatuses, sludge generated at the time is hydrothermally treated under high temperature and pressure, and magnetic particles are collected with magnetic separation in high temperature and pressure lines.

In flocculation processes of wastewater in the wastewater treatment apparatuses disclosed in Japanese Patent Application Laid-Open No. 11-123399 and Japanese Patent Application Laid-Open No. 11-207399, an inorganic flocculant is first added to the wastewater together with magnetic particles, microflocs are formed by rapidly stirring the wastewater, and subsequently, magnetic flocs are made to grow larger by adding a polymeric flocculant to the wastewater and then stirring it slowly. Namely, first, surface charges of solids in the water are neutralized with the inorganic flocculant to make the solids easy to flocculate, a contact frequency of each particle is increased by rapidly stirring the wastewater to thereby promote flocculation, and formed are small magnetic flocs in which the magnetic particles and the solids are uniformly mixed. Since there is much inorganic flocculant on surfaces of the magnetic flocs in this state, many of them are positively charged.

Consequently, the respective magnetic flocs are got together to form huge magnetic flocs by adding an anionic (negatively charged) polymeric flocculant, and improved is separation performance in a magnetic separation process of a subsequent stage. Here, a stirring intensity is reduced after adding the polymeric flocculant to the wastewater, which is because cross-links with the polymeric flocculant are destroyed as little as possible. In the magnetic flocs formed as described above, the solids and the magnetic particles to be removed are particularly firmly combined with each other with the inorganic flocculant, thus requiring a floc decomposition process with a hydrothermal reaction in order to decompose the combinations.

However, in the wastewater treatment apparatuses disclosed in Japanese Patent Application Laid-Open No. 11-123399 and Japanese Patent Application Laid-Open No. 11-207399, since the solids and the magnetic particles are firmly combined with each other with the inorganic flocculant, considerable energy must be given to obtain sufficient floc decomposition performance, and a structure of a hydrothermal reaction apparatus as a floc decomposition process also becomes complex.

According to Japanese Patent Application Laid-Open No. 11-123399, it is disclosed that sludge is guided to a magnetic particle separation apparatus after pressurizing it to a pressure not less than 10 MPa and heating it to a temperature less than approximately 350° C. In addition, according to Japanese Patent Application Laid-Open No. 11-207399, it is disclosed that sludge is guided to a magnetic particle separation apparatus after pressurizing it to a pressure approximately 2 MPa and heating it to a temperature around 200° C.

SUMMARY OF THE INVENTION

The present invention is made in view of such circumstances, and aims at providing a wastewater treatment method and a wastewater treatment apparatus by which energy required for decomposition of collected magnetic flocs can be reduced.

In order to achieve the above-described object, the present invention provides a wastewater treatment method in which magnetic flocs are formed by adding to wastewater an inorganic flocculant, magnetic particles, and a high molecular polymer as a polymeric flocculant, and the magnetic flocs are collected with magnetic force to thereby obtain treated water having the magnetic flocs removed from the wastewater, and the wastewater treatment method is characterized in that the magnetic particles are added to the wastewater after adding the inorganic flocculant to the wastewater to flocculate suspended solids in the wastewater, after that or substantially at the same time as the magnetic particles are added, the high molecular polymer is added to the wastewater, and flocculates of the suspended solids and the magnetic particles are combined with each other with the high molecular polymer to thereby obtain the magnetic flocs.

In order to achieve the above-described object, the present invention provides a wastewater treatment apparatus in which magnetic flocs are formed by adding to wastewater an inorganic flocculant, magnetic particles, and a high molecular polymer as a polymeric flocculant, and the magnetic flocs are collected with magnetic force to thereby obtain treated water having the magnetic flocs removed from the wastewater, and the wastewater treatment apparatus is characterized by comprising: a first addition device that adds the inorganic flocculant to the wastewater; a second addition device that adds the magnetic particles to the wastewater to which the inorganic flocculant has been added; and a third addition device that adds the high molecular polymer.

According to the present invention, flocs that are flocculated suspended solids are formed by adding an inorganic flocculant to wastewater and stirring the wastewater with the first addition device. Next, magnetic particles are added from the second addition device to the wastewater containing the flocs that are flocculated suspended solids. Subsequently or substantially at the same time as the magnetic particles are added, a polymeric flocculant is added from the third addition device to the wastewater to stir the wastewater, and thereby magnetic flocs, which are combinations of the flocs that are flocculated suspended solids and the magnetic particles, are formed. Here, combining power between the magnetic particles and the flocs that are flocculated suspended solids with the polymeric flocculant is weaker than that with the flocculant, thus resulting in easy decomposition of the magnetic particles and the suspended solids. Consequently, according to the present invention, energy required for decomposition of the collected magnetic flocs can be reduced.

It is preferable that the second addition device of the present invention adds the flocs formed by stirring and mixing the magnetic particles and the inorganic flocculant in the water.

It is preferable that the magnetic particles of the present invention contain triiron tetraoxide, and that a terminal velocity at the time of settling in the water is 0.01 to 1 msec.

In addition, according to the present invention, it is preferable to comprise: a magnetic separation device that separates and removes by magnetic force the magnetic flocs formed by adding the high molecular polymer; a magnetic particle collection device that collects the magnetic flocs separated by the magnetic separation device, and that decomposes the collected magnetic flocs to collect the magnetic particles; and a magnetic particle return device that returns the magnetic particles collected by the magnetic particle collection device to the second addition device.

According to the present invention, magnetic particles can be collected from the collected magnetic flocs with high efficiency with a simple apparatus configuration.

It is preferable that the magnetic particle collection device of the present invention utilizes a hydrothermal reaction at a temperature of 100 to 200° C.

In addition, according to the present invention, it is preferable that the magnetic particle return device comprises a magnetic detection device, and that a control device is included that controls an input amount of magnetic particles with respect to a magnetic floc formation device depending on an output from the magnetic detection device.

Further, according to the present invention, it is preferable that the magnetic separation devices are provided in series at a plurality of stages, detection devices are provided between the magnetic separation devices of preceding stages and the magnetic separation devices of subsequent stages, and that a control device is included that controls an injection amount of magnetic particles depending on outputs of the detection devices.

According to the present invention, energy required for decomposition of the collected magnetic flocs can be reduced. In addition, magnetic particles can be recycled in the present invention, thus enabling to reduce waste and running cost.

DETAILED DESCRIPTION OF THE PREFERRED EMBODIMENTS

Hereinafter will be described preferred embodiments of a wastewater treatment method and a wastewater treatment apparatus in accordance with the present invention according to accompanying drawings.

First Embodiment

Figure 1:
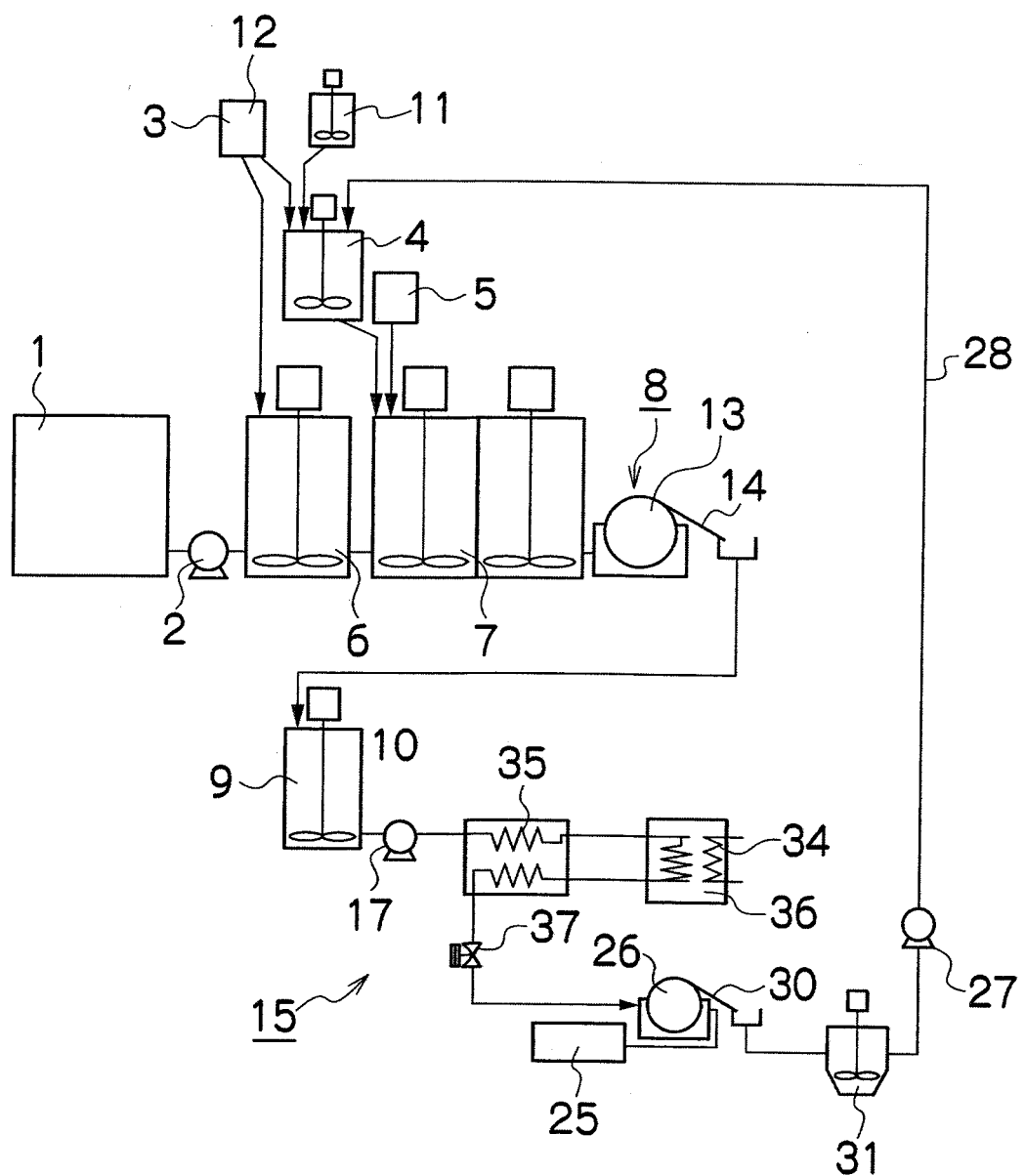
FIG. 1 is a configuration diagram showing a wastewater treatment apparatus of a first embodiment.

FIG. 1 is a structural diagram showing a wastewater treatment apparatus of a first embodiment.

Wastewater to be treated (wastewater containing small suspended solids and emulsified oil particles) is sent from a wastewater tank 1 to a rapid stirring tank 6 of the wastewater treatment apparatus by a wastewater pump 2. An inorganic flocculant, such as PAC (polyaluminum chloride), ferric sulfate, ferric chloride, or aluminum sulfate, is added to the wastewater in the rapid stirring tank 6 from a flocculant tank 3 (first addition device) by an inorganic flocculant injection pump (not shown), and then the wastewater is rapidly stirred in the rapid stirring tank 6.

The suspended solids or the emulsions such as oil, which have dispersed in the wastewater in the rapid stirring tank 6 due to the fact that surfaces thereof are negatively charged, becomes easy to flocculate since the inorganic flocculant neutralizes surface charges. A collision frequency of the suspended solids or the emulsions such as oil then increases due to rapid stirring of the wastewater in the rapid stirring tank 6, whereby the suspended solids or the emulsions such as oil are flocculated to be formed into a number of small clumps called microflocs.

Next, when the wastewater comes out of the rapid stirring tank 6 after an approximately 1 minute residence time therein, magnetic microflocs are added to this wastewater from a magnetic microfloc tank (second addition device) 4 by a magnetic microfloc injection pump (not shown). The magnetic microflocs are formed by adding an inorganic flocculant 12 to the water to then stir and mix it as well as dispersing ferromagnetic particles 11, such as magnetite, in the water. A position for adding the magnetic microflocs may be a connection path between the rapid stirring tank 6 and a slow stirring tank 7, or may be in the slow stirring tank 7. As a result of this, the water containing the microflocs and the water containing the magnetic microflocs are joined together in the slow stirring tank 7. Although the inorganic flocculant 12 to add to the water may be the same as the inorganic flocculant to add to the wastewater in the rapid stirring tank 6, or may be different from it, it is often easier to operate the apparatus when using the same one.

After or substantially at the same time when adding the magnetic microflocs to the wastewater in the slow stirring tank 7 from a magnetic microfloc tank 4, a polymeric flocculant is added to the slow stirring tank 7 from a high molecular polymer tank (third addition device) 5 by a high molecular polymer pump (not shown). Subsequently, the wastewater in the slow stirring tank 7 is stirred at a slow speed to grow magnetic flocs. It is desirable to use an anionic system as a polymeric flocculant, for example, polyacrylamide is suitable. In a case of using polyacrylamide, the apparatus has a structure that polyacrylamide is stored as powder, and that a fixed amount of it is injected into a high molecular polymer tank 5 with a feeder to stir it.

By the way, when the magnetic microflocs are added to the microflocs formed in the rapid stirring tank 6, the microflocs and the magnetic microflocs become dispersed in the water. When the high molecular polymer is added to this water, large magnetic flocs (hereinafter referred to as huge flocs), which are combinations of the microflocs and the magnetic microflocs, are formed in the slow stirring tank 7 while the high molecular polymer forms cross-links. As a result of this, both the suspended solids and the magnetic particles not to be removed are contained in the huge flocs.

Here, although the magnetic particles and the suspended solids in the wastewater are firmly combined with each other with the inorganic flocculant, it is a weak polymeric flocculant that combines magnetic bodies formed by combined magnetic particles with suspended solids formed by combined suspended solids. Consequently, combination of the magnetic bodies and the suspended solids are weaker than combination thereof with the flocculant, thus resulting in easy separation of the magnetic bodies and the suspended solids. Flocculated water containing the huge flocs that contain such magnetic bodies and suspended solids is sent to a magnetic separation apparatus (magnetic separation device) 8.

Installed in the magnetic separation apparatus 8 is a magnetic drum 13 that incorporates a permanent magnet, such as a neodymium magnet. When the flocculated water passes near this magnetic drum 13, the magnetic bodies contained in the huge flocs are attracted by magnetic force of the permanent magnet, and thereby the huge flocs are adsorbed onto a surface of the magnetic drum 13 through the magnetic bodies. The adsorbed huge flocs are lifted in the air along with a rotation of the magnetic drum 13, and are scraped by a scraper 14. The scraped huge flocs are sent to a collected floc decomposition apparatus (magnetic particle collection device) 15 as collected flocs. In addition, the wastewater from which the huge flocs have been collected are discharged to the outside of the apparatus as treated water.

A continuous hydrothermal reaction apparatus is exemplified in FIG. 1 as the collected floc decomposition apparatus 15.

The collected flocs are once stored in a collected floc tank 9. A stirrer is provided in the collected floc tank 9, and the collected flocs are prevented from settling out by stirring the inside of the tank 9 with the stirrer. The collected flocs in the collected floc tank 9 are pumped to a reaction container 36 by a high pressure pump 17, such as a plunger or a diaphragm one, and then predetermined heat is applied thereto by a heater 34. Although a main component of the collected flocs is water, the collected flocs do not evaporate even at a temperature not less than 100° C. because of their high pressure, and a hydrothermal reaction is performed in the reaction container 36.

In the embodiment, it is a further characteristic point that the hydrothermal reaction of the collected flocs is performed in a temperature range of 100 to 200° C. When the hydrothermal reaction of the collected flocs is performed at a temperature not less than 200° C., a flocculating action of the inorganic flocculant is rapidly lost, and thereby decomposition of the collected flocs is promoted. However, since the embodiment aims at taking out the magnetic particles as the microflocs, it is preferable to break only cross-links of the polymeric flocculant at a temperature not more than 200° C.

In the first embodiment, it is possible to decompose collected flocs at a temperature less than 200° C. although it has been considered that decomposition of the collected flocs utilizing the hydrothermal reaction requires a temperature not less than 200° C. in conventional apparatuses. As a result of this, there is an advantage that the wastewater treatment apparatus is substantially simplified, and that energy consumption spent on the hydrothermal reaction can also be reduced.

For example, when trying to perform a hydrothermal reaction at a temperature of 250° C., a wastewater treatment apparatus must be designed assuming a pressure not less than approximately 4 MPa, which is a saturation pressure at the temperature of 250° C. Meanwhile, when trying to perform a hydrothermal reaction at a temperature of 200° C., a wastewater treatment apparatus must be designed assuming a pressure of approximately 1.6 MPa, which is a saturation pressure at the temperature of 200° C.

In addition, it is preferable to install a heat exchanger 35 on a path where the collected flocs go to the reaction container 36 and on a path where they return from the reaction container 36. When the heat exchanger 35 is installed, the collected flocs going to the reaction container 36 can be pre-heated with a heat of the collected flocs returning from the reaction container 36, thus enabling to achieve energy saving of the heater 34.

The decomposed collected flocs whose temperature is decreased by the heat exchanger 35 is decompressed by a back pressure valve 37 to be atmospheric pressure, and is guided to a small magnetic separation apparatus 26.

The small magnetic separation apparatus 26 is the magnetic drum type one similar to the magnetic separation apparatus 8, where only the magnetic particles are separated from the suspended solids to be collected by a scraper 30, and are stored in a collected magnetic particle tank 31. The collected magnetic particles stored in the collected magnetic particle tank 31 are returned to the magnetic microfloc tank 4 to be recycled by a collected magnetic particle pump 27 through a magnetic particle recycle line (magnetic particle return device) 28. In addition, stored in a sludge tank 25 are the suspended solids separated from the magnetic particles by the small magnetic separation apparatus 26.

It is to be noted that although the drum type is exemplified as the small magnetic separation apparatus 26 in the embodiment, a similar effect can be obtained even though the other magnetic separation structure, such as a disk, a bar magnet, or a magnetic filter type, is employed.

In addition, the continuous hydrothermal reaction apparatus is exemplified as the collected floc decomposition apparatus 15 in the first embodiment, but the present invention is not limited to this. For example, a batch type hydrothermal reaction apparatus may be used. In addition, even when the other type of apparatus, for example, one of the followings: mechanical stirring and shear; pH adjustment; increase in temperature by heating under atmospheric pressure; and ultrasonic waves, or a combination thereof, is used, a similar effect to the above can be obtained.

Second Embodiment

Figure 2:
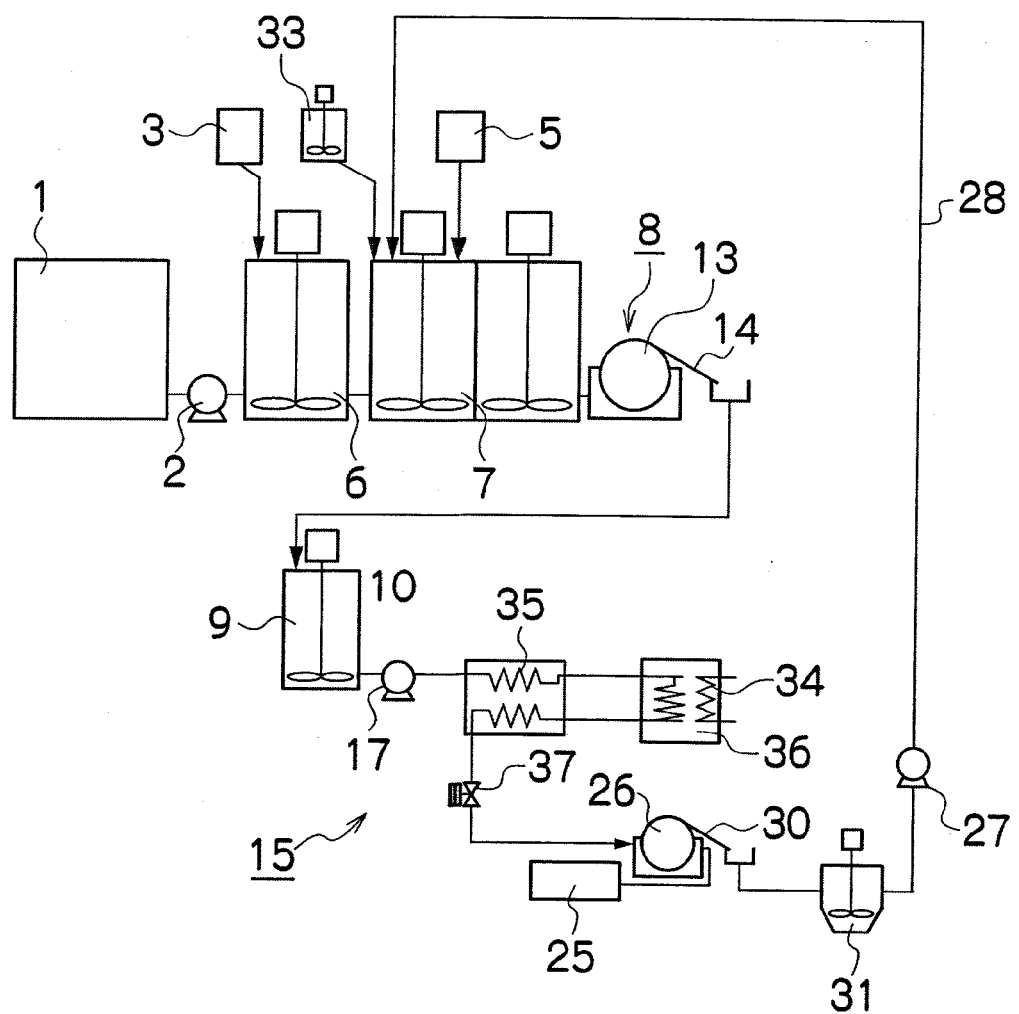
FIG. 2 is a configuration diagram showing a wastewater treatment apparatus of a second embodiment.

FIG. 2 is a structural diagram showing a wastewater treatment apparatus of a second embodiment.

A difference in configurations between the wastewater treatment apparatus of the second embodiment and the wastewater treatment apparatus of the first embodiment shown in FIG. 1 lies in the fact that appropriate magnetic particles are used in advance instead of using magnetic microflocs in the second embodiment. These magnetic particles are stored in a magnetic particle tank 33, and a position where these magnetic particles are added to wastewater is the same as the position where the magnetic microflocs are added in the wastewater treatment apparatus shown in FIG. 1.

Here, the appropriate magnetic particles are required to have a relation between a density and a particle diameter thereof hard to settle out and reside in the magnetic particle tank 33 and in the apparatus to which they have been added, and further, required to have magnetization and a particle diameter with which the magnetic flocs are easy to be magnetically separated in the magnetic separation apparatus 8 of a subsequent stage. Still further, the magnetic particles are required to have a particle diameter easy to be separated in the collected floc separation apparatus 15 of a subsequent stage.

In order to satisfy these requirements, first, triiron tetraoxide ($Fe_3O_4$) is suitable for magnetic bodies to be contained since they are better to be as stable and inexpensive as possible, but a contained amount of triiron tetraoxide is required to be as large as possible in order to make magnetic separation easy to perform.

Meanwhile, when the contained amount of triiron tetraoxide is too large, the magnetic bodies become easy to settle out since a density thereof is larger as compared with water, and thus they easily settle out and reside in the apparatus, causing a difficulty in use.

Consequently, the seeming density of the particles can be reduced to some extent in a state of containing triiron tetraoxide by solidifying triiron tetraoxide with resin etc. Here, triiron tetraoxide is considerably heavier than water since specific gravity thereof is approximately 5, and therefore, a material as light as possible is suitable for resin to be used. In addition, although it is more desirable that the particle diameter of the magnetic particles is larger in order to make the magnetic particles easy to separate by the collected floc separation apparatus 15, too much contained amount of triiron tetraoxide causes the difficulty of handling, and too much contained amount of resin causes deterioration of magnetic separation performance.

Namely, magnetic particles suitable for the second embodiment contain triiron tetraoxide, and they can be represented with a relation between a density and a particle diameter, that is, the relation can be defined by a terminal velocity at the time of settling of the magnetic particles in the water, which is determined by the density and the particle diameter.

An appropriate terminal velocity at the time of settling of the magnetic particles in the water is 0.01 to 1 m/sec. When the terminal velocity is larger than this, a problem of the difficulty of handling occurs due to settling and residence of the magnetic particles, and when the terminal velocity is smaller than this, a problem causing the reduction of magnetic separation performance occurs.

It is to be noted that there has been described that the magnetic particles are formed by solidifying them with resin etc. in the above-mentioned embodiment, but the present invention is not limited to this. For example, if particles formed of magnetic bodies only are used as long as they satisfy the above-described terminal velocity, similar effects to the above can be obtained except that separation performance in the collected floc separation apparatus 15 is inferior due to the smaller particle diameter as compared with the case where the magnetic particles containing resin etc. are used.

Third Embodiment

Figure 3:
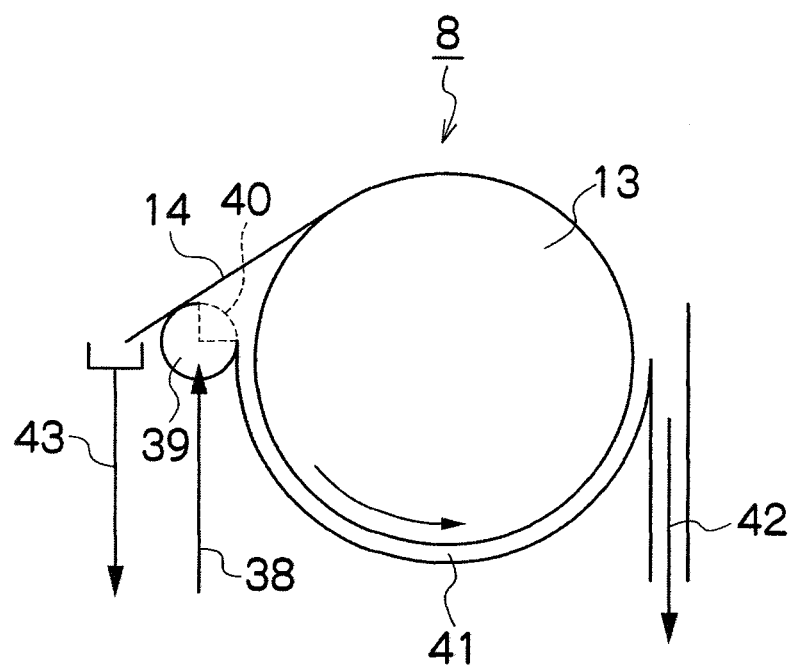
FIG. 3 is a configuration diagram showing a wastewater treatment apparatus of a third embodiment.

FIG. 3 is a structural diagram showing a wastewater treatment apparatus of a third embodiment.

In the wastewater treatment apparatuses shown in FIGS. 1 and 2, the magnetic drum type has been illustrated as a structure of the magnetic separation apparatus 8, and there has been illustrated a case where a rotational direction of the drum and a flowing direction of a fluid are opposite to each other. In this structure, the surface of the magnetic drum where the magnetic flocs are collected by the scraper 14 to be cleaned passes near an outlet of treated water, and thus, the structure is suitable for a structure to stably keep water quality of the treated water clean.

However, on the other hand, the surface of the magnetic drum on which a large amount of magnetic flocs accumulates passes near a flow inlet of the water with high floc concentration. Hence, particularly when wastewater with high concentration is treated, in the magnetic flocs containing the magnetic bodies and the suspended solids combined with weak force as in the embodiment, the combination is destroyed near the flow inlet. As a result of this, there occurs a problem that the magnetic flocs with a comparatively smaller content rate of the magnetic bodies leak to a treated water side without being attracted by the magnetic drum.

Consequently, as shown in FIG. 3, a structure is suitable that the rotational direction of the drum and the flowing direction of the fluid are made to be the same as each other. Since relative velocities of the magnetic drum 13 and a fluid 41 can be reduced by employing this structure, the magnetic flocs are efficiently collected by the magnetic separation apparatus 8 without being destroyed in the middle of the wastewater treatment even though they are the ones in which the magnetic bodies and the suspended solids are combined with the weak force of the high molecular polymer as in the embodiment.

In addition, as for a flow inlet 38, a notch 40 is formed at a side surface of a horizontal pipe 39 as shown in FIG. 3, and when the wastewater is made to flow in through the notch 40, it is possible to make it flow in uniformly without causing residence etc., without destroying the magnetic flocs.

With the present structure, the magnetic flocs are attracted without being destroyed by the magnetic drum 13, and are continuously scraped by the scraper 14 to be collected in a collection portion 43, and at the same time, good treated water 42 can be obtained.

Fourth Embodiment

Figure 4:
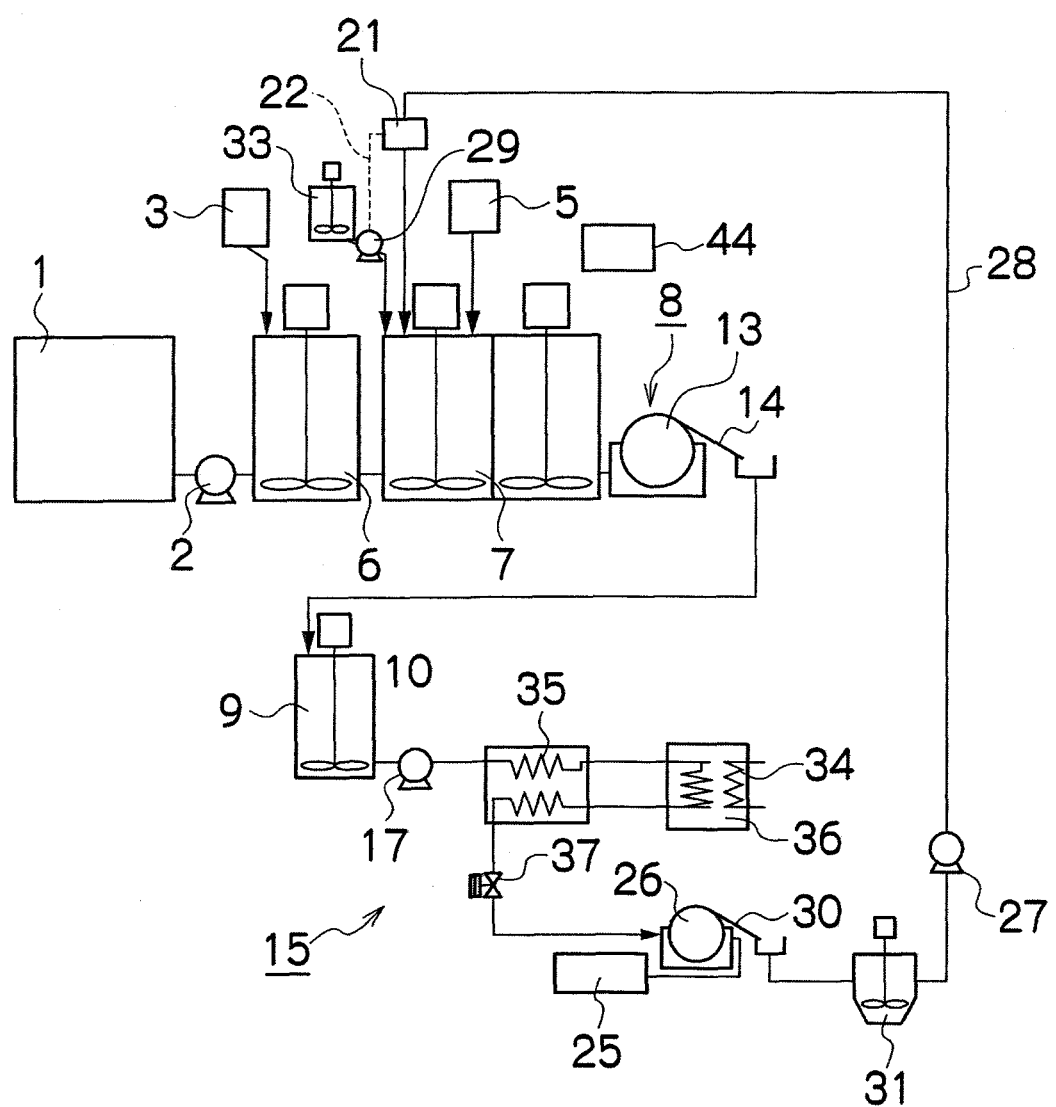
FIG. 4 is a configuration diagram showing a wastewater treatment apparatus of a fourth embodiment.

FIG. 4 is a structural diagram of a wastewater treatment apparatus of a fourth embodiment.

In addition to the wastewater treatment apparatuses shown in FIGS. 1 and 2, this wastewater treatment apparatus is configured such that an amount of magnetic particles that flow through the magnetic particle recycle line 28 is measured by a sensor 21, and that an injection amount of the magnetic particles from a magnetic particle injection pump 29 is controlled by a control unit 44 depending on an output value from the sensor 21. Namely, the control unit 44 stores in advance an addition amount of the magnetic particles to add to the slow stirring tank 7 per unit time, subtracts the amount of the magnetic particles measured by the sensor 21 from the addition amount, and controls drive of the magnetic particle injection pump 29 so as to supply this subtracted amount therefrom.

The present structure enables the apparatus to be operated with the most suitable addition amount of magnetic particles. In the present embodiment, described is an example of using the sensor 21 for the wastewater treatment apparatus shown in FIG. 2, but a similar effect can be obtained even when the sensor 21 is used for the wastewater treatment apparatus shown in FIG. 1. As the sensor 21, a sensor that utilizes a Hall device, a SQUID (superconducting quantum interference device), or an eddy current can be exemplified.

Meanwhile, when the sensor 21 is not utilized as in the wastewater treatment apparatuses shown in FIGS. 1 and 2, it is possible to keep water treatment performance stable by adding an excess amount of magnetic particles. In this case, although there is a disadvantage that a size of the collected floc decomposition apparatus 15 becomes large due to a larger amount of collected flocs, there is an advantage that a sensor and a controller become unnecessary.

Fifth Embodiment

Figure 5:
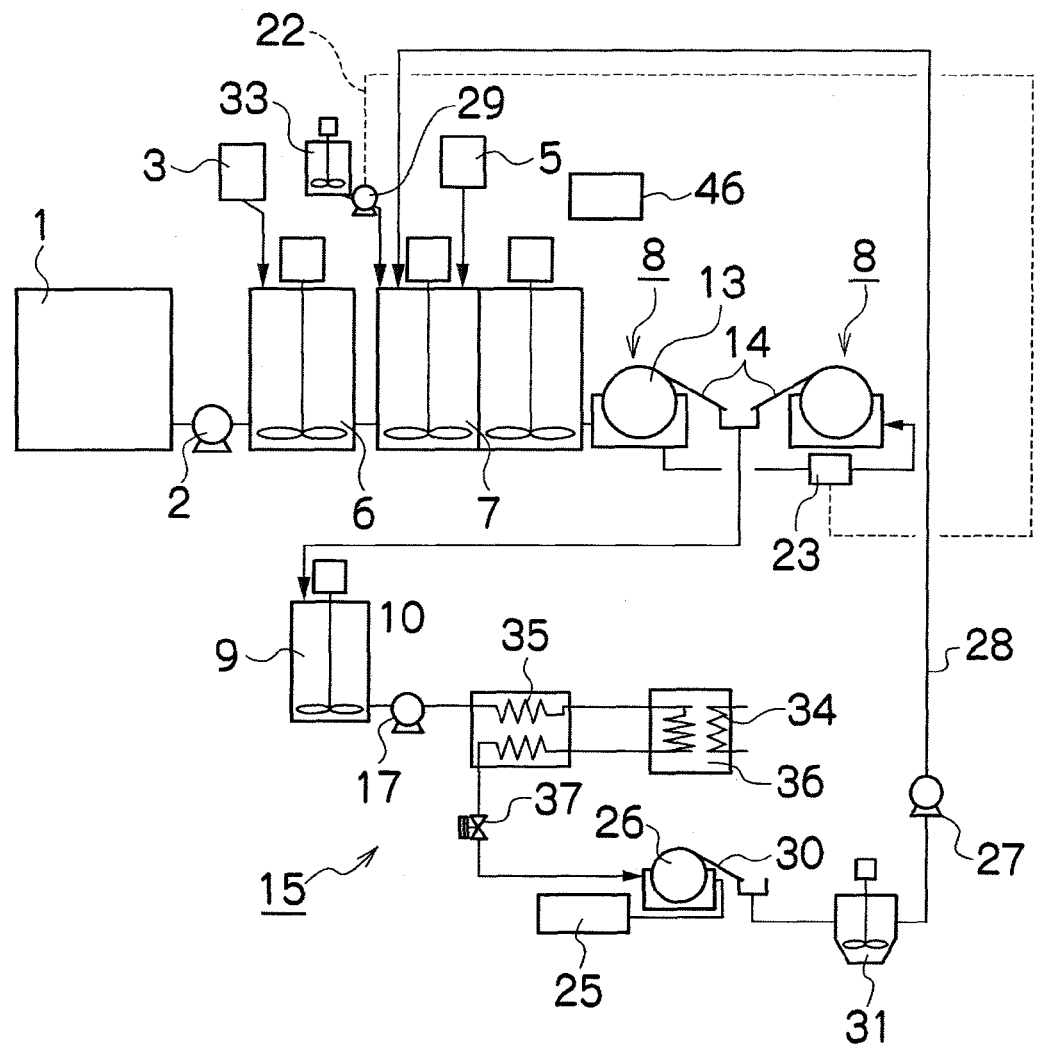
FIG. 5 is a configuration diagram showing a wastewater treatment apparatus of a fifth embodiment.

FIG. 5 is a structural diagram showing a wastewater treatment apparatus of a fifth embodiment.

In addition to the wastewater treatment apparatuses shown in FIGS. 1 and 2, this wastewater treatment apparatus is configured such that a plurality of magnetic separation apparatuses 8 (two in FIG. 5) are provided in series, and a sensor 23 is installed in the middle of them. The magnetic particle injection pump 29 is controlled by a control unit 46 based on an output value from this sensor 23. Namely, the control unit 46 stores in advance an addition amount of the magnetic particles to add to the slow stirring tank 7 per unit time, subtracts the amount of the magnetic particles measured by the sensor 23 from the addition amount, and controls drive of the magnetic particle injection pump 29 so as to supply this subtracted amount therefrom.

In the present structure, a structure of the sensor 23 becomes simple since it only has to measure, for example, SS (suspended solids), turbidity, etc. A value in treated water of the magnetic separation apparatus 8 of a preceding stage is measured by this sensor 23, and then the following control may be performed: the magnetic particle injection pump 29 is turned on at a point over a predetermined upper limit value; the magnetic particle injection pump 29 is turned off at a point under a predetermined lower limit value; or an injection amount of the magnetic particles from the magnetic particle injection pump 29 is continuously changed depending on the output value of the sensor 23. Since the sensor 23 is installed between the magnetic separation apparatus 8 and the magnetic separation apparatus 8, even when the addition amount of the magnetic particles is decreased, there is no possibility to immediately have a large effect on the whole quality of treated water.

It is to be noted that as shown in FIG. 5 if the two magnetic separation apparatuses 8 are installed, when two adjacent scrapers 14 and 14 are located opposed to each other, it is possible to make the apparatus smaller in size since collected flocs collected by the scrapers 14 and 14 are gathered together. Although the wastewater treatment apparatus shown in FIG. 5 is illustrated as an example based on the wastewater treatment apparatus shown in FIG. 2, a similar effect can be obtained even when the wastewater treatment apparatus based on FIG. 1 is used. In addition, in the embodiment shown in FIG. 5, the similar effect can be obtained even when the magnetic separation structure shown in FIG. 3 is used.

What is claimed is:

1. A wastewater treatment method in which magnetic flocs are formed by adding to wastewater an inorganic flocculant, magnetic particles, and a high molecular polymer as a polymeric flocculant, and the magnetic flocs are collected with magnetic force to thereby obtain treated water having the magnetic flocs removed from the wastewater, comprising:
    adding the inorganic flocculant to the wastewater in a rapid stirring tank to flocculate suspended solids in the wastewater,
    discharging the wastewater with flocculates of the suspended solids from the rapid stirring tank,
    adding the magnetic particles to the wastewater with flocculates of the suspended solids after the wastewater with flocculates of the suspended solids is discharged from the rapid stirring tank,
    after or substantially at the same time as the magnetic particles are added to the wastewater with flocculates of the suspended solids, adding the high molecular polymer to the wastewater, whereby flocculates of the suspended solids and the magnetic particles are combined with each other with the high molecular polymer in a slow stirring tank to thereby obtain the magnetic flocs.

2. A wastewater treatment apparatus in which magnetic flocs are formed by adding to wastewater an inorganic flocculant, magnetic particles, and a high molecular polymer as a polymeric flocculant, and the magnetic flocs are collected with magnetic force to thereby obtain treated water having the magnetic flocs removed from the wastewater, the wastewater treatment apparatus comprising:
    a rapid stirring tank;
    a first addition device that adds the inorganic flocculant to the wastewater in the rapid stirring tank;
    a second addition device, downstream of the rapid stirring tank, that adds the magnetic particles to the wastewater to which the inorganic flocculant has been added and which has been discharged from the rapid stirring tank;
    a third addition device that adds the high molecular polymer;
    a slow stirring tank that stirs wastewater to which has been added the inorganic flocculant, the magnetic particles, and the high molecular polymer; and
    a control device configured to control the second addition device to control an amount of the magnetic particles added by the second addition device per unit time.

3. The wastewater treatment apparatus according to claim 2, wherein the second addition device adds flocs formed by stirring and mixing the magnetic particles and the inorganic flocculant in the water.

4. The wastewater treatment apparatus according to claim 3, comprising:
    a magnetic separation device that separates and removes by magnetic force the magnetic flocs formed by adding the high molecular polymer;
    a magnetic particle collection device that collects the magnetic flocs separated by the magnetic separation device, and that decomposes the collected magnetic flocs to collect the magnetic particles; and
    a magnetic particle return device that returns the magnetic particles collected by the magnetic particle collection device to the second addition device.

5. The wastewater treatment apparatus according to claim 4, wherein the magnetic particle collection device utilizes a hydrothermal reaction at a temperature of 100 to 200° C.

6. The wastewater treatment apparatus according to claim 5, wherein the magnetic particle return device comprises a magnetic detection device, and a control device is included that controls an input amount of the magnetic particles with respect to a magnetic floc formation device depending on an output from the magnetic detection device.

7. The wastewater treatment apparatus according to claim 6, wherein the magnetic separation devices are provided in series at a plurality of stages, detection devices are provided between the magnetic separation devices of preceding stages and the magnetic separation devices of subsequent stages, and a control device is included that controls an injection amount of magnetic particles depending on outputs of the detection devices.

8. The wastewater treatment apparatus according to claim 5, wherein the magnetic separation devices are provided in series at a plurality of stages, detection devices are provided between the magnetic separation devices of preceding stages and the magnetic separation devices of subsequent stages, and a control device is included that controls an injection amount of magnetic particles depending on outputs of the detection devices.

9. The wastewater treatment apparatus according to claim 4, wherein the magnetic particle return device comprises a magnetic detection device, and a control device is included that controls an input amount of the magnetic particles with respect to a magnetic floc formation device depending on an output from the magnetic detection device.

10. The wastewater treatment apparatus according to claim 9, wherein the magnetic separation devices are provided in series at a plurality of stages, detection devices are provided between the magnetic separation devices of preceding stages and the magnetic separation devices of subsequent stages, and a control device is included that controls an injection amount of magnetic particles depending on outputs of the detection devices.

11. The wastewater treatment apparatus according to claim 4, wherein the magnetic separation devices are provided in series at a plurality of stages, detection devices are provided between the magnetic separation devices of preceding stages and the magnetic separation devices of subsequent stages, and a control device is included that controls an injection amount of magnetic particles depending on outputs of the detection devices.

12. The wastewater treatment apparatus according to claim 2, wherein the magnetic particles contain triiron tetraoxide, and a terminal velocity of the magnetic particles at the time of settling in the water is 0.01 to 1 m/sec.

13. The wastewater treatment apparatus according to claim 12, comprising:
   a magnetic separation device that separates and removes by magnetic force the magnetic flocs formed by adding the high molecular polymer;
   a magnetic particle collection device that collects the magnetic flocs separated by the magnetic separation device, and that decomposes the collected magnetic flocs to collect the magnetic particles; and
   a magnetic particle return device that returns the magnetic particles collected by the magnetic particle collection device to the second addition device.

14. The wastewater treatment apparatus according to claim 13, wherein the magnetic particle collection device utilizes a hydrothermal reaction at a temperature of 100 to 200° C.

15. The wastewater treatment apparatus according to claim 14, wherein the magnetic particle return device comprises a magnetic detection device, and a control device is included that controls an input amount of the magnetic particles with respect to a magnetic floc formation device depending on an output from the magnetic detection device.

16. The wastewater treatment apparatus according to claim 15, wherein the magnetic separation devices are provided in series at a plurality of stages, detection devices are provided between the magnetic separation devices of preceding stages and the magnetic separation devices of subsequent stages, and a control device is included that controls an injection amount of magnetic particles depending on outputs of the detection devices.

17. The wastewater treatment apparatus according to claim 14, wherein the magnetic separation devices are provided in series at a plurality of stages, detection devices are provided between the magnetic separation devices of preceding stages and the magnetic separation devices of subsequent stages, and a control device is included that controls an injection amount of magnetic particles depending on outputs of the detection devices.

18. The wastewater treatment apparatus according to claim 13, wherein the magnetic particle return device comprises a magnetic detection device, and a control device is included that controls an input amount of the magnetic particles with respect to a magnetic floc formation device depending on an output from the magnetic detection device.

19. The wastewater treatment apparatus according to claim 18, wherein the magnetic separation devices are provided in series at a plurality of stages, detection devices are provided between the magnetic separation devices of preceding stages and the magnetic separation devices of subsequent stages, and a control device is included that controls an injection amount of magnetic particles depending on outputs of the detection devices.

20. The wastewater treatment apparatus according to claim 13, wherein the magnetic separation devices are provided in series at a plurality of stages, detection devices are provided between the magnetic separation devices of preceding stages and the magnetic separation devices of subsequent stages, and a control device is included that controls an injection amount of magnetic particles depending on outputs of the detection devices.

21. A wastewater treatment apparatus in which magnetic flocs are formed by adding to wastewater an inorganic flocculant, magnetic particles, and a high molecular polymer as a polymeric flocculant, and the magnetic flocs are collected with magnetic force to thereby obtain treated water having the magnetic flocs removed from the wastewater, the wastewater treatment apparatus comprising:
   a rapid stirring tank;
   a first addition device that adds the inorganic flocculant to the wastewater in the rapid stirring tank;
   a source of magnetic particles;
   a second addition device, downstream of the rapid stirring tank and connected to the source of magnetic particles, that adds the magnetic particles to the wastewater to which the inorganic flocculant has been added and which has been discharged from the rapid stirring tank;
   a third addition device that adds the high molecular polymer; and
   a slow stirring tank that stirs wastewater to which has been added the inorganic flocculant, the magnetic particles, and the high molecular polymer.

22. The wastewater treatment apparatus according to claim 21, further comprising a control device configured to control the second addition device to control an amount of the magnetic particles added by the second addition device per unit time.

* * * * *